(12) United States Patent
Tsai (10) Patent No.: US 12,233,976 B2
(45) Date of Patent: Feb. 25, 2025

(54) SEAT RAIL LOCKING STRUCTURE OF SADDLE

(71) Applicant: Foming Bicycle Parts Co., Ltd., Fuxing Township, Changhua County (TW)

(72) Inventor: Shang-Tsang Tsai, Fuxing Township (TW)

(73) Assignee: Foming Bicycle Parts Co., Ltd., Fuxing Township (TW)

( * ) Notice: Subject to any disclaimer, the term of this patent is extended or adjusted under 35 U.S.C. 154(b) by 119 days.

(21) Appl. No.: 18/166,535

(22) Filed: Feb. 9, 2023

(65) Prior Publication Data

US 2024/0270339 A1    Aug. 15, 2024

(51) Int. Cl.
*B62J 1/08* (2006.01)
*B62J 1/02* (2006.01)

(52) U.S. Cl.
CPC .. *B62J 1/08* (2013.01); *B62J 1/02* (2013.01)

(58) Field of Classification Search
CPC ...................................... B62J 1/02; B62J 1/08
See application file for complete search history.

(56) References Cited

U.S. PATENT DOCUMENTS

| | | | | |
|---|---|---|---|---|
| 5,507,476 A | * | 4/1996 | Lin | B62J 1/02 297/211 |
| 6,007,148 A | * | 12/1999 | Yu | B62J 1/02 297/211 |
| 6,443,524 B1 | * | 9/2002 | Yu | B62J 1/02 297/211 |
| 6,773,061 B1 | * | 8/2004 | Shu | B62J 1/02 297/211 |
| 7,093,894 B2 | * | 8/2006 | Yu | B62J 1/02 297/452.41 |
| 8,944,502 B2 | * | 2/2015 | Winefordner | B62J 1/10 297/202 |
| 9,764,788 B1 | * | 9/2017 | Sung | F16F 3/10 |
| D982,333 S | * | 4/2023 | Tsai | D6/354 |
| 2005/0029842 A1 | * | 2/2005 | Martin | B62J 1/02 280/220 |
| 2017/0355410 A1 | * | 12/2017 | Yim | B62J 1/28 |
| 2019/0061853 A1 | * | 2/2019 | Krause | B62J 1/02 |
| 2019/0291801 A1 | * | 9/2019 | Sung | F16F 13/007 |
| 2023/0080662 A1 | * | 3/2023 | Ouyang | B62J 1/08 297/215.13 |

\* cited by examiner

*Primary Examiner* — Philip F Gabler
(74) *Attorney, Agent, or Firm* — Demian K. Jackson; Jackson IPG PLLC (57) ABSTRACT

A seat rail locking structure of a saddle includes a cushion body, and a connecting base assembled with the rear of the bottom of the cushion body. The connecting base has an insert slot, and the seat rail has a turning part and two support arms, and the turning part is assembled with the front of the bottom of the cushion body, and the rear ends of the two support arms are plugged into the insert slot of the connecting base, and as topper provided for stopping and fixing of the two support arms, and the fastener is inserted between the connecting base and the stopper in order to combine and fix the stopper with the connecting base, so as to enhance the bonding strength between the seat rail and the cushion body, achieve a better buffer and shock absorbent effect.

7 Claims, 10 Drawing Sheets

SEAT RAIL LOCKING STRUCTURE OF SADDLE

BACKGROUND OF THE DISCLOSURE

Technical Field

The present disclosure relates to a saddle, and more particularly to the structure of a bicycle saddle.

DESCRIPTION OF THE RELATED ART

Bicycles are one of the favorite transportation means offering highly convenient, energy-free, pollution-free exercise and leisure opportunities. With the rise of leisure activities in recent years, people are paying more and more attention to the quality of life and leisure time, and bicycles have gradually become more popular and widely used nowadays.

Figure 10:
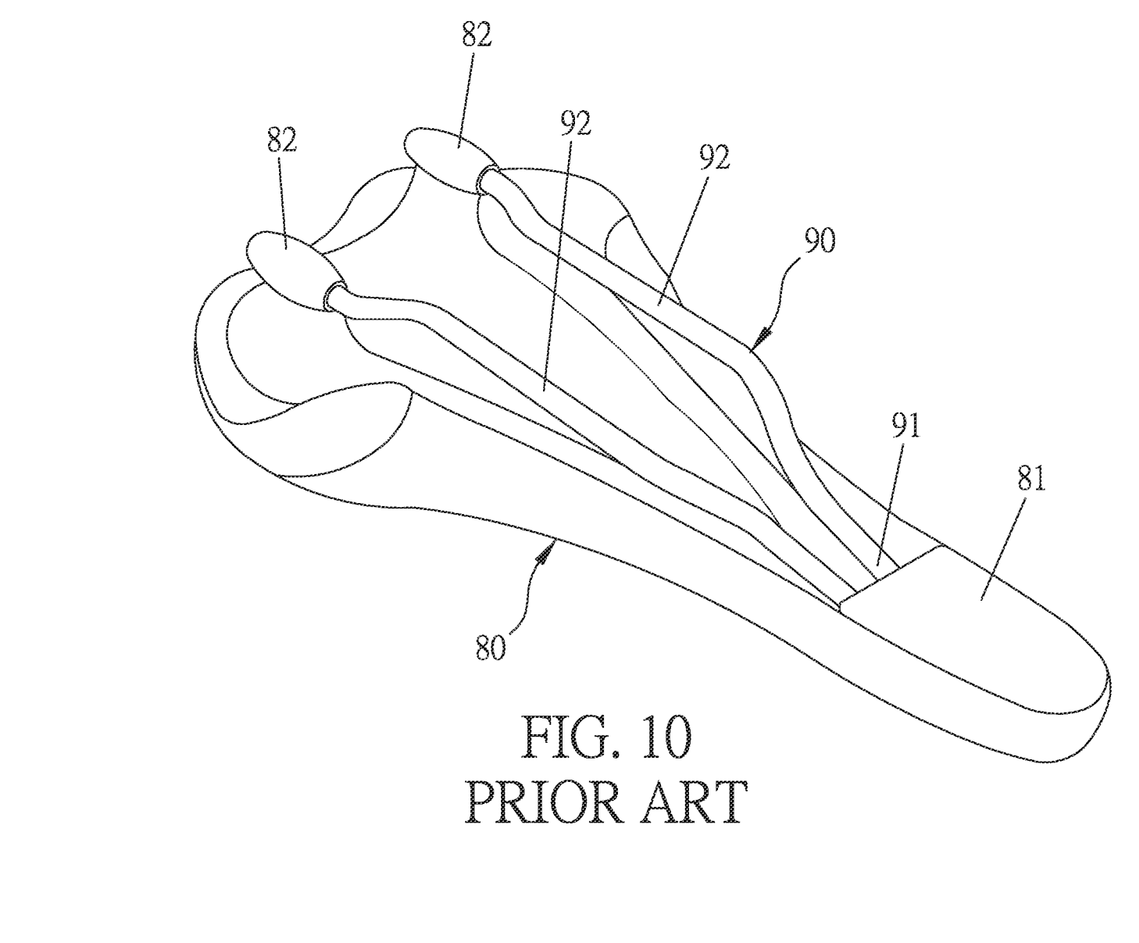
FIG. 10 is a perspective view of a conventional bicycle saddle.

When a rider rides a bicycle, a saddle is mainly provided to support the rider's body weight. With reference to FIG. 10 for a conventional bicycle saddle, the saddle comes with a tapered cushion body 80, amount 81 disposed at the front of the bottom of the saddle, two rail supports 82 disposed at the rear of the bottom of the saddle, and a seat rail 90 formed by bending a metal rod, which is installed between the mount 81 and the two rail supports 82. The seat rail 90 has a U-shape turning part 91 and two (left and right) support arms 92 extending backwardly from the turning part 91, and the turning part 91 is plugged into and combined with the mount 81 of the cushion body 80, and the rear ends of the two support arms 92 are plugged into and combined with the two rail supports 82 of the cushion body 80 respectively.

However, the conventional bicycle saddle has the following drawbacks. Although a rider can increase comfort while riding by means of stuffing a material such as foam or silicone into the cushion body 80, there is no other structural design provided to buffer and provide shock absorbance. What is more, both sides of the cushion body 80 are combined with the two support arms 92 of the seat rail 90 directly, and the overall elasticity and buffering effect of the saddle are limited, thus causing discomfort. More importantly, the seat rail 90 is assembled with the cushion body 80 by forced insertion, thus making the installation and disassembly difficult and the bonding strength between the seat rail 90 and the cushion body 80 low, thus failing to provide a comfortable and secured saddle.

SUMMARY OF THE DISCLOSURE

The present disclosure provides a seat rail locking structure of a saddle, which includes: a cushion body having a fixing part disposed at the front end of the bottom of the cushion body, and two elastic elements disposed on two sides of the rear end of the bottom of the cushion body respectively, and each elastic element having a through hole formed at the center of the elastic element; a connecting base, having a combining part disposed at each of the two ends of the combining part, and the two combining parts being attached to the bottom ends of the two elastic elements respectively, and each of the two combining parts having a combining hole formed at the center thereof and a locking unit being passed through the combining holes of the two combining parts and the through holes of the two elastic elements and locked to the two sides of the rear end of the bottom of the cushion body separately, and the connecting base having an insert slot formed at a middle section of the front of the connecting base, and the connecting base further having a positioning hole formed at a middle position of the top of the connecting base and communicating with the insert slot; a seat rail, having a turning part disposed at the front end of the seat rail, and a support arm extending backwardly from two ends of the turning part separately, and each of the two support arms having a clamped section connected to an inwardly extended bend section, and the turning part being combined and fixed to the fixing part of the cushion body, and the clamped section and the bend section disposed at the rear ends of the two support arms being plugged into the insert slot of the connecting base; a stopper, socketed into the insert slot of the connecting base, for stopping and fixing the bend sections of the two support arms of the seat rail, and clamping and limiting the clamped sections of the two support arms of the seat rail, and the stopper having a snapping hole formed at a middle position of the stopper; and a fastener, inserted into the positioning hole of the connecting base and the snapping hole of the stopper, for combining and fixing the stopper with the connecting base.

It is a primary objective of this disclosure to provide a simple installation/disassembly of the seat rail with the cushion body and enhance the bonding strength between the seat rail and the cushion body.

Another objective of this disclosure is to provide two elastic elements between the connecting base and the cushion body, and a stopper in the insert slot of the connecting base in order to enhance the buffer and shock absorbent effect and improve the riding comfort of the bicycle saddle.

DESCRIPTION OF THE PREFERRED EMBODIMENTS

The present invention will be clearer from the following description when viewed together with the accompanying drawings, which show, for purpose of illustrations only, a preferred embodiment in accordance with the present invention.

With reference to FIGS. 1 to 7 for a seat rail locking structure of a saddle in accordance with this disclosure, the seat rail locking structure includes a cushion body 10, a connecting base 20, a seat rail 30, a stopper 40 and a fastener 50.

The cushion body 10 includes a fixing part 11 disposed at the front of the bottom of the cushion body 10, and two elastic elements 12 disposed on two sides of the rear of the bottom of the cushion body 10 respectively, and the two elastic elements 12 are in a hollow cylindrical form and made of a polyurethane material with a shock-absorbing effect, and the center of each elastic element 12 is formed with a through hole 121.

Each of the two sides of the connecting base 20 is provided with a combining part 21, and the two combining parts 21 are attached to the bottom ends of the two elastic elements 12 respectively, and the centers of the two combining parts 21 are formed with a combining hole 211, and a locking unit 212 is passed through the combining holes 211 of the two combining parts 21 and the through holes 121 of the two elastic elements 12 and locked to two sides of the rear of the bottom of the cushion body 10, so that the two elastic elements 12 are clamped between two sides of the rear of the bottom the cushion body 10 and the two combining parts 21 of the connecting base 20, and the middle section of the front of the connecting base 20 is provided with a horizontal long insert slot 22, and the middle positon of the top of the connecting base 20 is formed with a positioning hole 23 which is communicated with the insert slot 22, and the positioning hole 23 is substantially hollow and T-shaped, and the middle position of the bottom inside the insert slot 22 is provided with a sliding rib 221, and the middle position inside the insert slot 22 and spaced from the opening of the insert slot 22 is provided with a positioning bump 222.

A turning part 31 is disposed at the front end of the seat rail 30, and a support arm 32 is extended backwardly from each of the two ends of the turning part 31, and each of the two support arms 32 has a clamped section 321 connected to an inwardly extended bend section 322, and the turning part 31 is combined and fixed to the fixing part 11 of the cushion body 10, and the clamped section 321 and the bend section 322 at the rear ends of the two support arms 32 are plugged into the insert slot 22 of the connecting base 20.

The stopper 40 is socketed into the insert slot 22 of the connecting base 20 and provided for stopping and fixing the bend sections 322 of the two support arms 32 of the seat rail 30 and clamping and limiting the clamped sections 321 of the two support arms 32 of the seat rail 30, and a snapping hole 41 is formed at a middle position of the stopper 40, and an elastic groove 42 is formed on two (left and right) sides of the snapping hole 41 separately, and a sliding groove 43 is formed at a middle position of the bottom of the stopper 40. The sliding groove 43 is slidably mounted onto sliding rib 221 of the connecting base 20, and two limit protrusions 44 are disposed at a middle position of the rear side of the stopper 40, plugged between the bend sections 322 of the two support arms 32 of the seat rail 30, and sheathed on two sides of the positioning bump 222 of the connecting base 20 respectively.

The fastener 50 is plugged into the positioning hole 23 of the connecting base 20 and the snapping hole 41 of the stopper 40, and the fastener 50 includes a positioning part 51 with a shape corresponding to the shape of the positioning hole 23 and a snapping part 52 with a shape corresponding to the shape of the snapping hole 41. The positioning part 51 is snapped into the positioning hole 23, and the snapping part 52 is snapped into the snapping hole 41, so as to form a secured combination and fixation between the stopper 40 and the connecting base 20.

Figure 1:
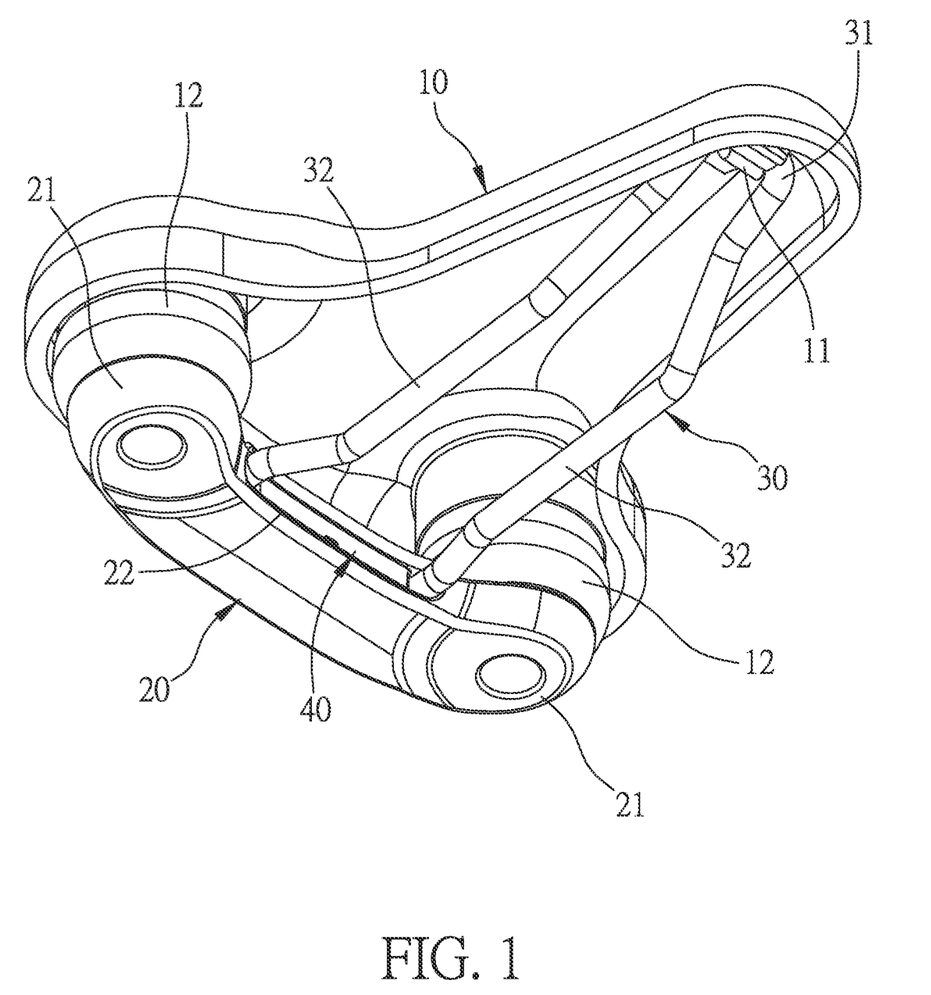
FIG. 1 is a perspective view of this disclosure.
Figure 2:
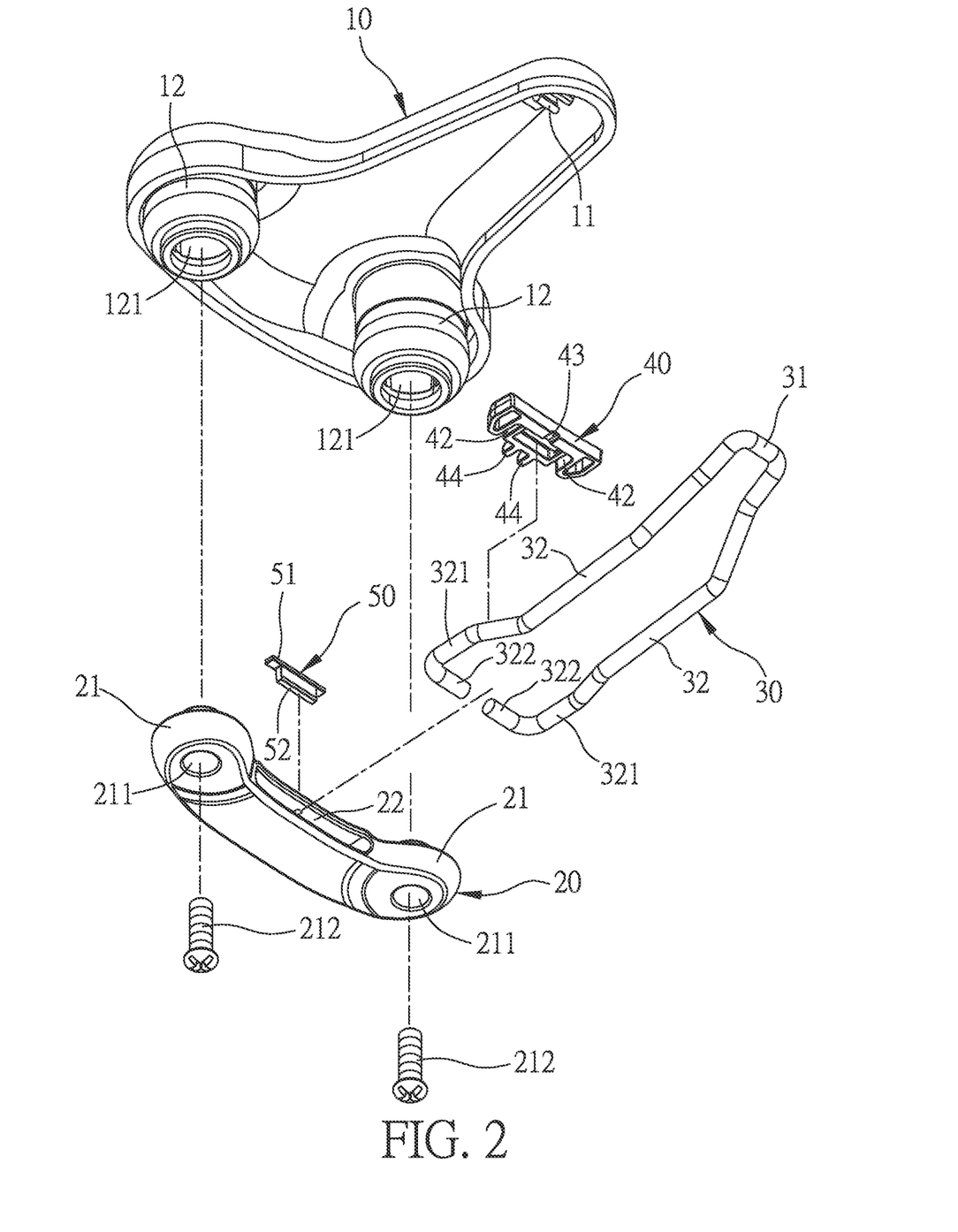
FIG. 2 is an exploded view of this disclosure.
Figure 3:
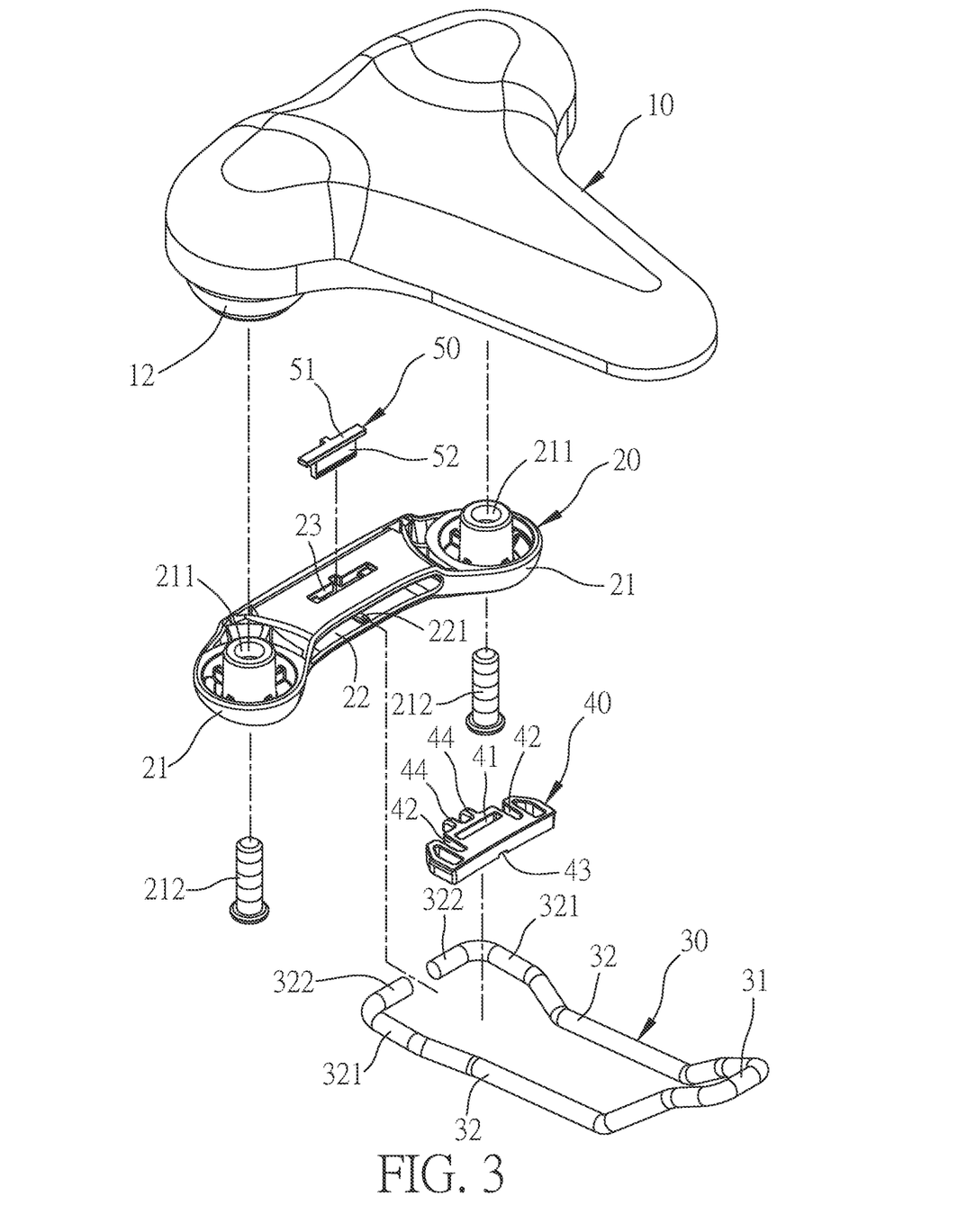
FIG. 3 is another exploded view of this disclosure.
Figure 4:
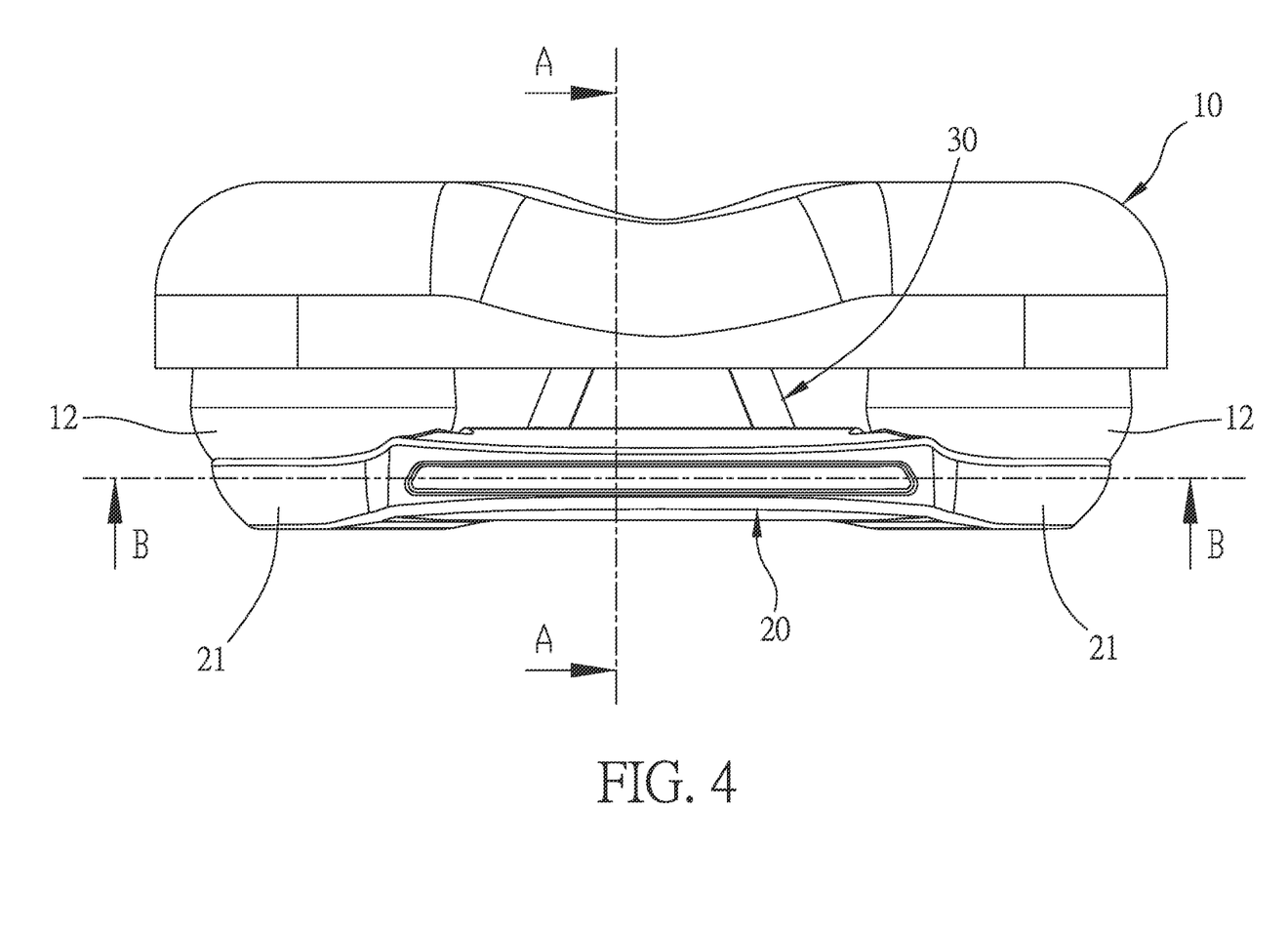
FIG. 4 is a rear plane view of this disclosure.
Figure 5:
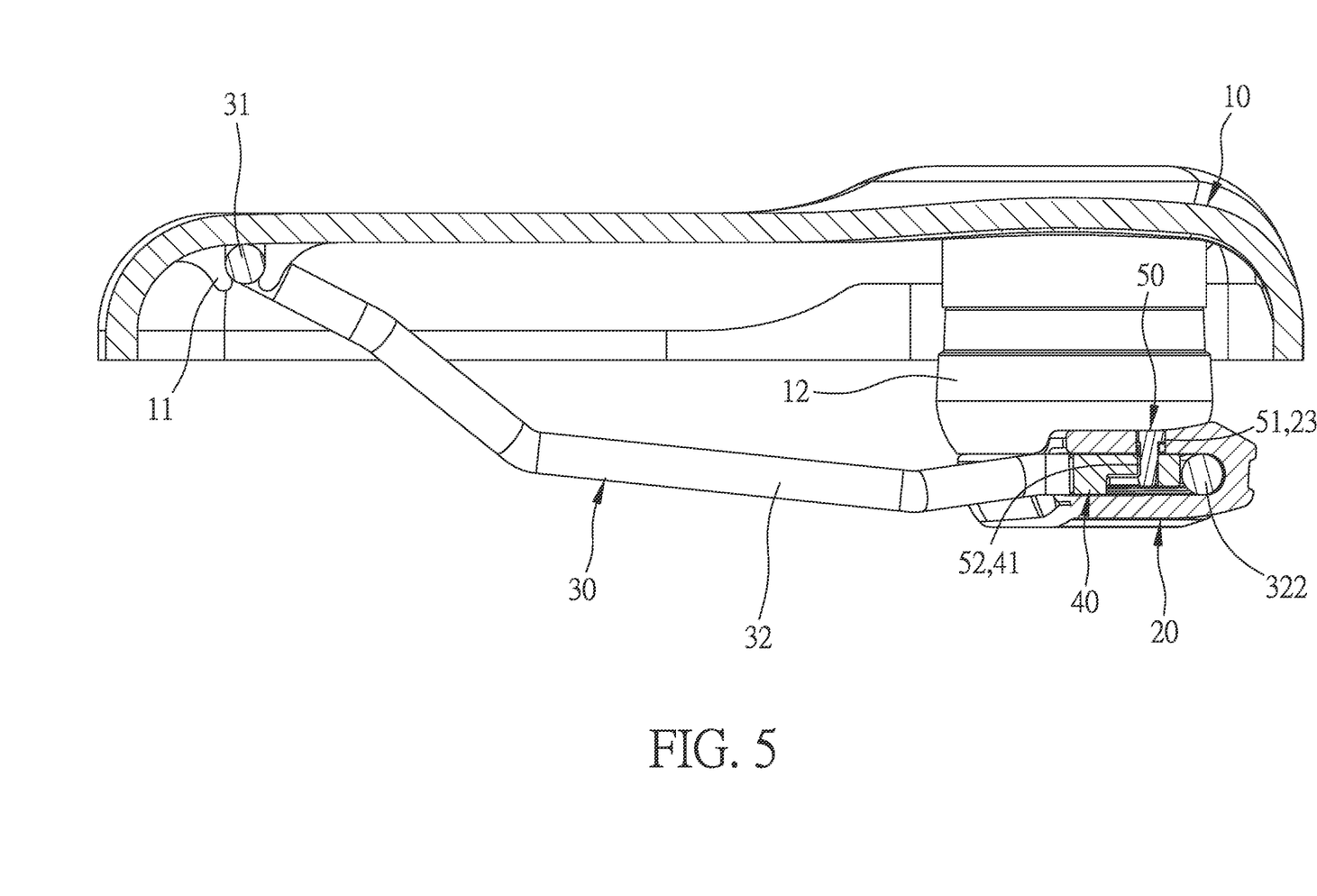
FIG. 5 is a cross-section view of Section A-A of FIG. 4.
Figure 6:
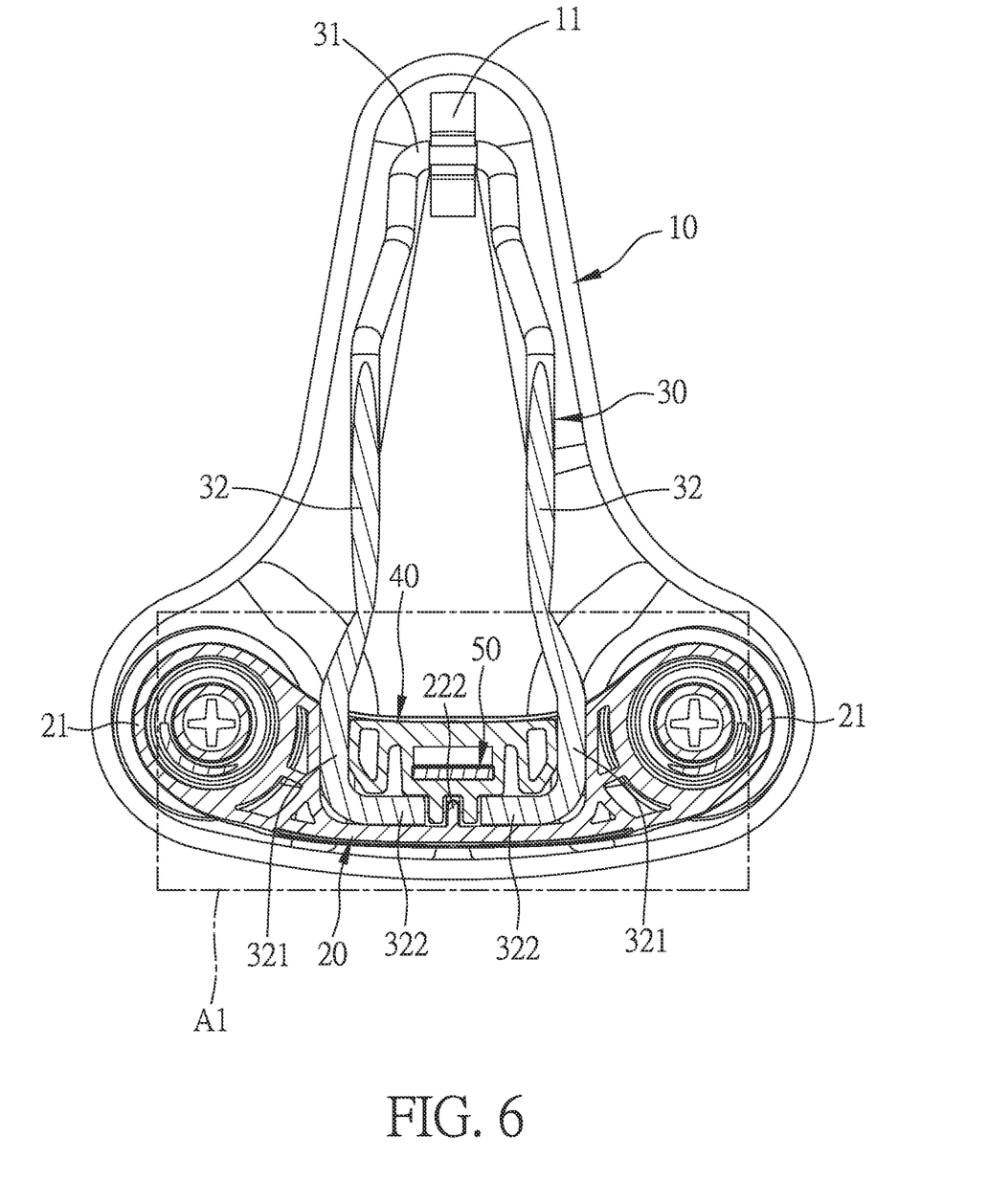
FIG. 6 is a cross-section view of Section B-B of FIG. 4.
Figure 7:
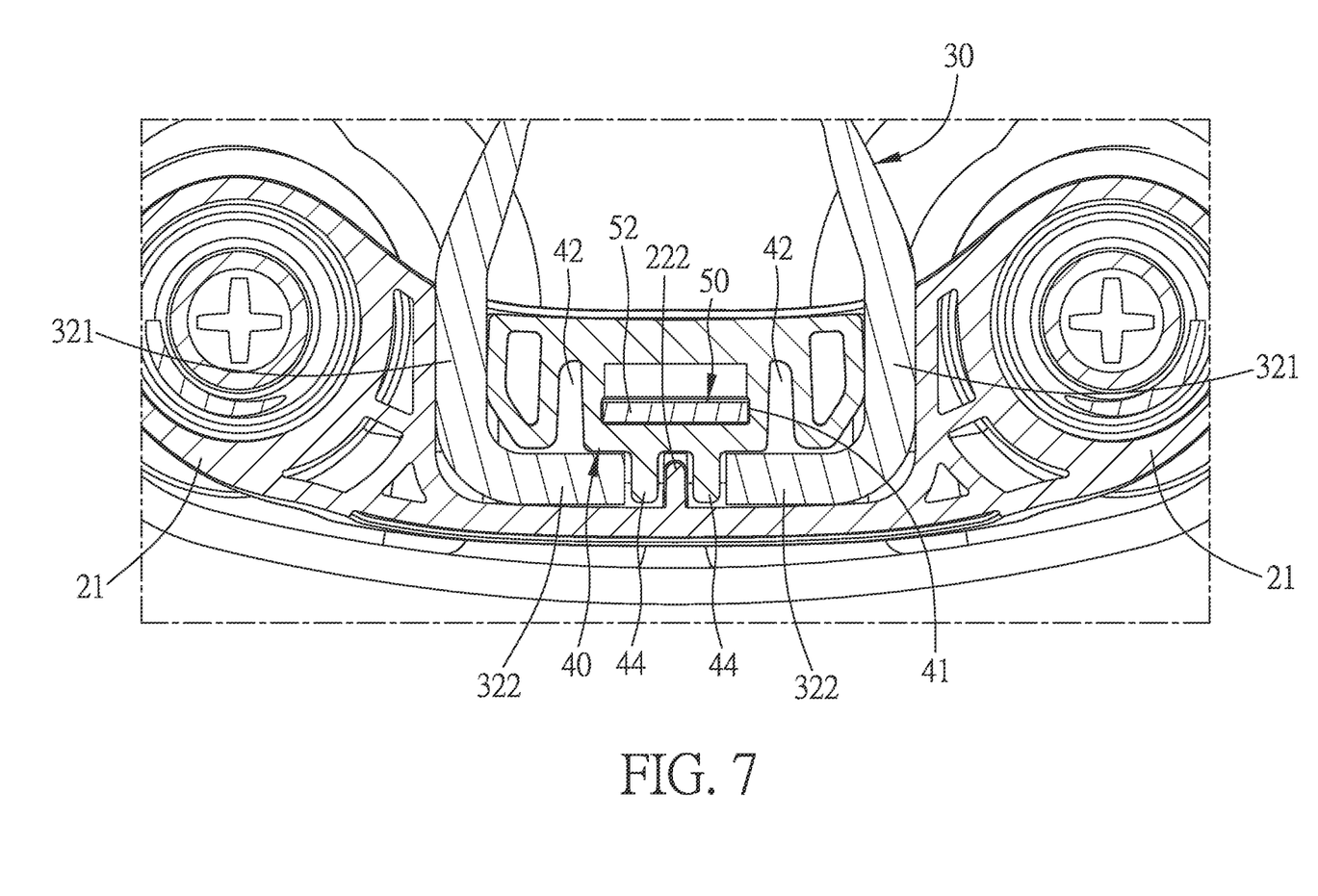
FIG. 7 is an enlarged view of Part A1 of FIG. 6.
Figure 8:
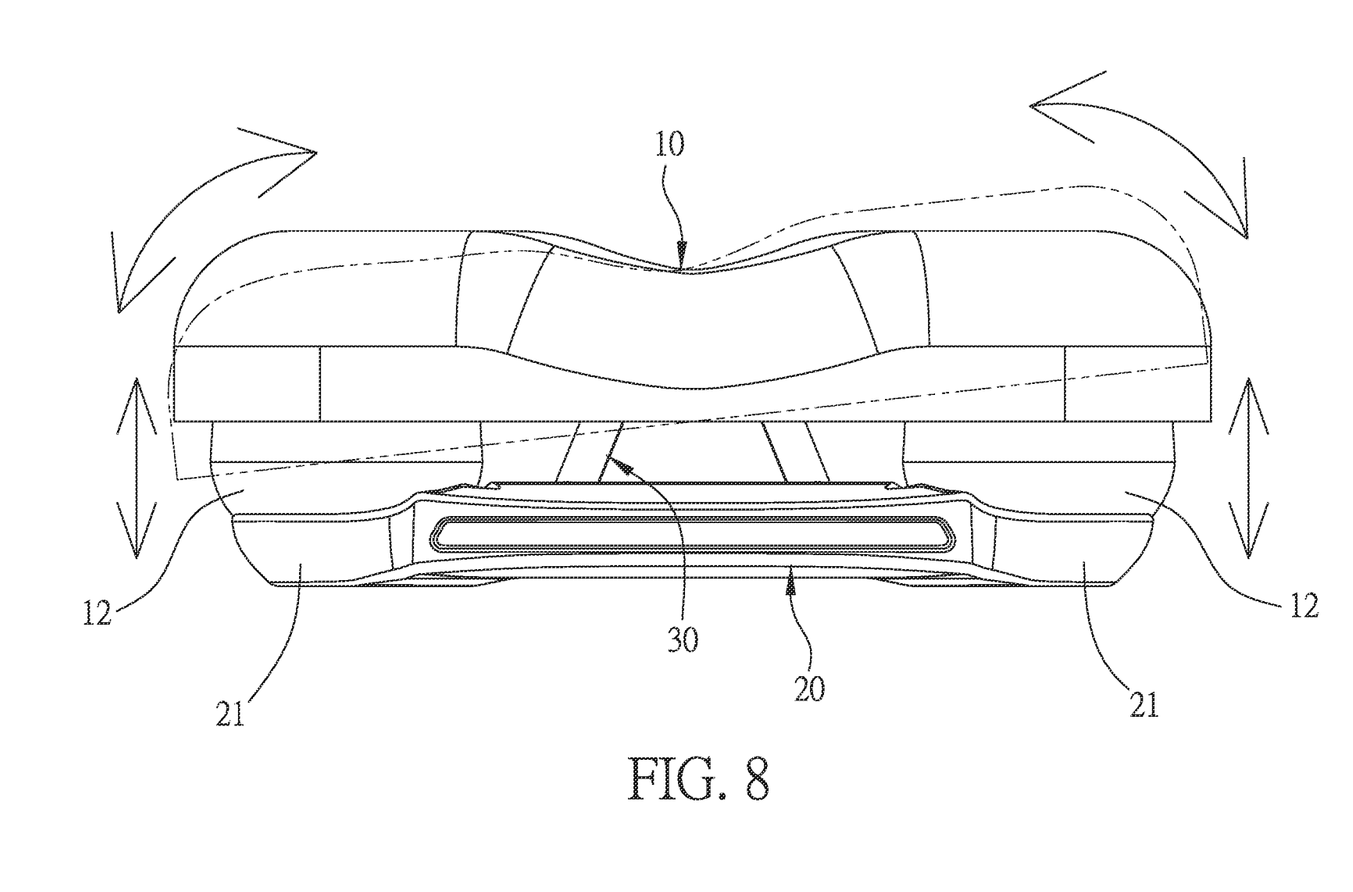
FIG. 8 is a schematic view showing the status of this disclosure when a force is exerted.
Figure 9:
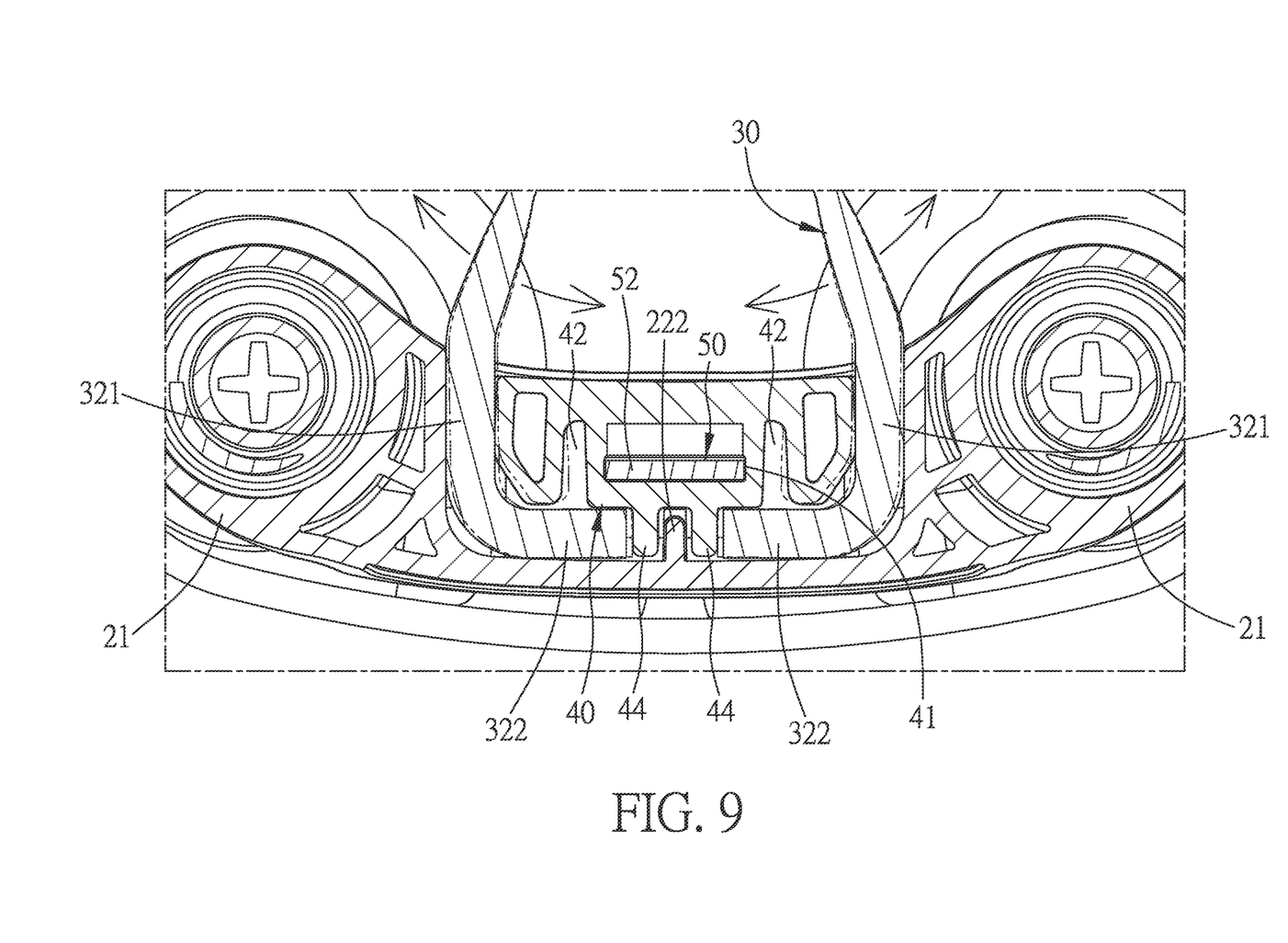
FIG. 9 is a schematic view showing the elastic deformation of this disclosure when a force is exerted.

When use, the middle section of the two support arms 32 of the seat rail 30 are mounted and fixed onto the seat post of the bicycle. Vibrations of the bicycle produced by the bumpy road surface during riding can be compressed, extended and absorbed by the two elastic elements 12 to achieve the shock absorbent effect. As shown in FIGS. 8 and 9, the two elastic grooves 42 of the stopper 40 form an elastically deformed space, and the configuration with the two limit protrusions 44 of the stopper 40 plugged between the bend sections 322 of the two support arms 32 of the seat rail 30, and the two limit protrusions 44 of the stopper 40 sheathed on two sides of the positioning bumps 222 of the connecting base 20 provides a limiting effect, so that the two support arms 32 of the seat rail 30 have the elasticity with inward bias, and when the cushion body 10 shifts sideway, the buffer and shock absorbent effect can be achieved by the aforementioned elastically deformed space and limiting effect to improve the riding comfort of the bicycle saddle.

By the structure as described in the embodiments above, this disclosure has the following advantages:

1. In the seat rail locking structure of a saddle of this disclosure, the seat rail 30 and the cushion body 10 can be installed or disassembled easily, and the bonding strength between the seat rail 30 and the cushion body 10 can be enhanced to improve the structural stability.
2. In the seat rail locking structure of the disclosed saddle, two elastic elements 12 are installed between the connecting base 20 and the cushion body 10, and a stopper 40 is configured to be located in the insert slot 22 of the connecting base 20. By the elastic deformation and limiting effect of the two elastic elements 12 and the stopper 40, an improved buffer and shock absorbent effect can be achieved to improve the riding comfort of the bicycle saddle.

While various embodiments in accordance with the present invention have been shown and described, it is clear to those skilled in the art that further embodiments may be made without departing from the scope of the present invention.

What is claimed is:

1. A seat rail locking structure of a saddle, comprising:
    a cushion body, having a fixing part disposed at the front end of the bottom thereof, and two elastic elements disposed on two sides of the rear end of the bottom of the cushion body respectively, and each elastic element having a through hole formed at the center thereof;
    a connecting base, having a combining part disposed at each of the two ends thereof, and the two combining parts being attached to the bottom ends of the two elastic elements respectively, and each of the two combining parts having a combining hole formed at the center thereof and a locking unit being passed through the combining holes of the two combining parts and the through holes of the two elastic elements and locked to the two sides of the rear end of the bottom of the cushion body separately, and the connecting base having an insert slot formed at a middle section of the front thereof, and the connecting base having a positioning hole formed at a middle position of the top thereof and communicating with the insert slot;
    a seat rail, having a turning part disposed at the front end thereof, and a support arm extending backwardly from each of two ends of the turning part separately, and each of the two support arms having a clamped section coupled to an inwardly extended bend section, and the turning part being combined and fixed to the fixing part of the cushion body, and the clamped section and the bend section disposed at the rear ends of the two support arms being plugged into the insert slot of the connecting base;
    a stopper, socketed into the insert slot of the connecting base, for stopping and fixing the bend sections of the two support arms of the seat rail, and clamping and limiting motion of the clamped sections of the two support arms of the seat rail, and the stopper having a snapping hole formed at a middle position thereof; and a fastener, inserted into the positioning hole of the connecting base and the snapping hole of the stopper, for combining and fixing the stopper with the connecting base.

2. The seat rail locking structure of a saddle according to claim 1, wherein the positioning hole is substantially hollow and T-shaped, and the fastener comprises a shape corresponding to the shape of the positioning hole and a snapping part with a shape corresponding to the shape of the snapping hole, and a positioning part is snapped into the positioning hole, and the snapping part is snapped into the snapping hole.

3. The seat rail locking structure of a saddle according to claim 1, wherein the insert slot of the connecting base comprises a sliding rib installed at a middle position of the bottom therein, and the stopper comprises a sliding groove formed at a middle position of the bottom thereof, and the sliding groove is slidably mounted on the sliding rib of the connecting base.

4. The seat rail locking structure of a saddle according to claim 1, wherein the stopper comprises an elastic groove separately formed on both left and right sides of the snapping hole.

5. The seat rail locking structure of a saddle according to claim 1, wherein the stopper comprises two limit protrusions disposed at a middle position thereof, and the two limit protrusions are plugged between the bend sections of the two support arms of the seat rail, and the two limit protrusions are sheathed on two sides of a positioning bump of the connecting base respectively.

6. The seat rail locking structure of a saddle according to claim 1, wherein the insert slot of the connecting base comprises the positioning bump disposed at a middle position therein and spaced from an opening of the insert slot, and the stopper comprises two limit protrusions disposed at the middle position of the rear side thereof, and the two limit protrusions are plugged between the bend sections of the two support arms of the seat rail, and the two limit protrusions are sheathed on two sides of the positioning bump of the connecting base respectively.

7. The seat rail locking structure of a saddle according to claim 1, wherein the two elastic elements are in a hollow cylindrical form and made of a polyurethane material.

\* \* \* \* \*